Sept. 12, 1950  H. G. FISCHER ET AL  2,522,217
COMPOSITE BIT DEVICE FOR SCREW
DRIVERS AND THE LIKE
Filed Nov. 6, 1946
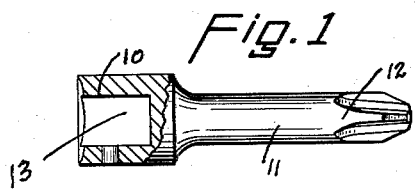
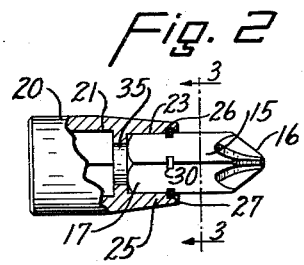
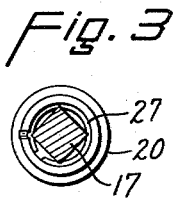
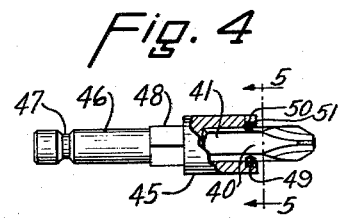
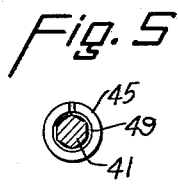
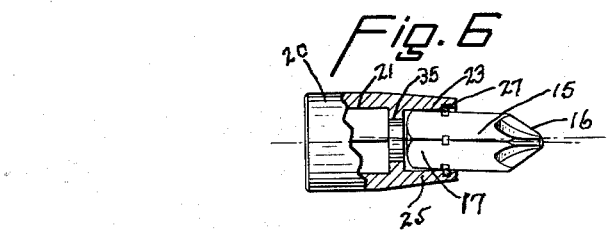
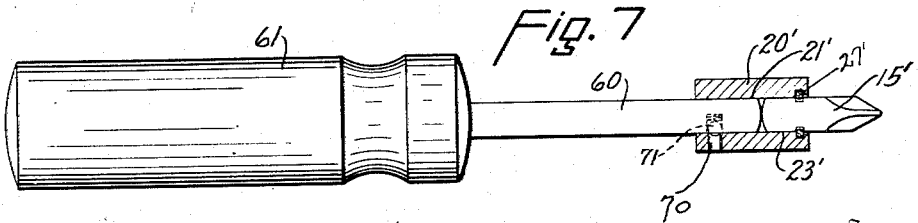
Inventors
HARRY G. FISCHER
LEROY J. WENDLING
By Marechal & Biebel Attorneys Patented Sept. 12, 1950

2,522,217

UNITED STATES PATENT OFFICE 2,522,217

COMPOSITE BIT DEVICE FOR SCREW DRIVERS AND THE LIKE

Harry G. Fischer and Le Roy J. Wendling, Dayton, Ohio, assignors to The Apex Machine & Tool Company, Dayton, Ohio, a corporation of Ohio Application November 6, 1946, Serial No. 708,062

3 Claims. (Cl. 145—50)

This invention relates to bits or screw drivers, such as are used with power driven drivers and hand braces or drivers. This application is a continuation in part of our application Serial No. 496,542, now abandoned, filed July 29, 1943, for improvement in Bits.

In recent years, especially in industries such as the aircraft and automobile industry, the use of recessed head screws and bolts has grown until such are used in a great variety of kinds, sizes and dimensions; and the great variety of places in which such recessed head screws and bolts are used and the necessity for using them in such large quantities has led to the widespread use of power drivers, using electric and pneumatic motive power, in addition to the use of these bits with more conventional hand screw drivers and hand operated brace type or spiral type of drivers. A good illustration of a bit of the character referred to and widely known in industry is the Phillips bit, which is illustrated in Fig. 1 of the drawing, but it is to be understood that this type of bit is utilized merely for illustrative purposes, because of its very widespread use.

Such bits, as illustrated in Fig. 1 have heretofore been made of a single piece of suitable metal, and preferably of a special shock resisting steel treated to have a high degree of toughness and hardness, and have been formed with a socket or drive end for engagement with a drive shaft or chuck of a power or hand driving tool and with a bit end accurately machined for engagement within the head recess of a screw or bolt of a particular type and size. Despite the use in these bits of very carefully selected and treated alloys, they tend to wear out rapidly under normal conditions or repeated regular use. Their initial cost is substantial, both because of the material therein and the machining operations necessary in forming them, and it is a general practice to return them to the factory for reconditioning, to remachine the bit end for further use. However, such reconditioning usually results in shortening their length by approximately ⅛", and since they are initially rather short, for example having only about ½ inch available for reconditioning in a bit of ¼ inch diameter, each bit can be reconditioned only a few times before becoming wholly useless. Moreover, such reconditioning involves a machining operation of considerable cost amounting to a substantial fraction of the initial cost of the bit.

It is accordingly one of the principal objects of the present invention to provide bit devices, for use with recessed-head screws and bolts, of such character and construction that the above difficulties are substantially overcome and the original replacement cost of the bits will be greatly reduced over the former type of bit device described.

Another object is to provide a construction in which all of the drive receiving and bit parts need not be returned for reconditioning.

Still another object is to provide small bit parts for connection to a driving part, in which the actual bit portion which fits into the recessed screw head may be made of a different grade of metal; and, in addition, so many more of these smaller bit parts can be made from a ton of metal that there will be greater economies effected even though the bit portions are not returned for reconditioning.

Another object of the invention is to provide a two-part bit construction in which one part serves to receive, or be received by, the hand or power driver and also to receive bit portions which are properly constructed to fit the screw head recess and which can nevertheless be much cheaper and generally of material of composition more preferable for the bit than that which is required when the whole bit mechanism is made in one part, such as chisel steel.

Still another object of the invention is to provide a special form of separable drive part which may be utilized for hand or power drivers and which will also readily receive short special bit parts and which is of such construction as to permit ready removal and insertion of bits of the desired size and configuration and which will also give some flexibility as between the drive part and the bit part so as to avoid the excessive care which is ordinarily required for lining up the unitary devices such as in Fig. 1 when satisfactory use is desired and excessively rapid wear is to be avoided.

Other objects and advantages of the invention will be apparent from the following description, the accompanying drawings and the appended claims.

In the drawings,

Fig. 1 illustrates a conventional form of unitary bit of the character described for use with a Phillips screw or bolt and having a square socket for receiving a drive shaft;

Fig. 2 is a side view partly in elevation and partly in section of a composite bit device constructed in accordance with the present invention and adapted also to receive a square driving member;

Fig. 3 is a sectional view taken approximately on the line 3—3 in Fig. 2;

Fig. 4 is a side view partly in elevation and partly in section of a composite bit constructed in accordance with the invention but adapted for driving engagement in a chuck type of driving member;

Fig. 5 is a sectional view taken approximately on the line 5—5 in Fig. 4;

Fig. 6 is a view similar to Fig. 2 but illustrating in somewhat exaggerated and diagrammatic fashion the axial misalignment between the parts of the bit device which may take place in use; and Fig. 7 is a view of a modified form of composite bit and drive member shown mounted upon the shaft of a hand operated screw driver, parts being broken away and shown in vertical section to illustrate details of internal construction.

Referring to Fig. 1, the unitary bit device of the conventional construction will be seen to be formed of a single bar of metal initially of the diameter of the larger drive end 10 and which requires several machining operations to reduce it to the lesser diameter of the portion 11 carrying the bit point 12, this latter diameter being approximately half that of the socket portion, and also a further machining operation to provide the socket 13 for a driving member. This is in contrast with the much simpler construction of the preferred embodiments of the present invention shown in the other figures of the drawing.

Referring to Figs. 2 and 3, the bit device of the present invention when ready for use comprises a separable bit member 15, which is shown as square in cross section except at the working end where it is tapered and grooved, as indicated generally by the numeral 16, to the right dimensions and inclination to fit the bit-receiving recess of the particular screw or bolt with which it is intended to be used. The bit holder 20 is provided with a squared socket portion 21 at one end to receive a driving shaft having a squared end, and it has an annular portion 25 at its other end formed internally to provide a squared socket portion 23 to receive the similarly squared end 17 of the bit 15.

The end 25 of bit holder 20, which contains the socket 23 and is adapted to receive the bit, is preferably externally tapered. Adjacent its extreme end, the inner walls of socket 23 are provided with an internal groove 26 which receives therein a resilient wire spring 27, preferably made of piano wire or some such high tensile spring wire. This wire is formed in such dimensions that when assembled in grooves 26, it will have an internal diameter presenting an opening somewhat less than the diagonal of the square bit portion 17. This bit portion is provided on each of its four corners as shown, with a notch or groove 30. This notch need not extend all around the bit but preferably is cut out of each corner, and as shown it is spaced from the inner end of the bit a limited distance less than the distance from the spring 27 to the shoulder or abutment 35 at the inner end or bottom of socket 23.

It will be noted, as stated, that the spring ring 27 is so formed that when in position in the socket, and without a bit 15 inserted, the internal diameter is somewhat less than the diagonal between two opposing corners of the bit, and as a result as the bit is pushed into place, the snap spring is first expanded and then as the notches 30 come opposite this spring ring, it immediately contracts and thus holds the removable bit member locked in place with sufficient force, the bottom of the socket which receives the bit serving to prevent the bit from pushing too far during operation.

It will be seen that the bit member 15 can be readily removed from the bit holder by giving a pull that will overcome the restraining action of the snap spring 27, and that this will permit changing bits whenever desired. Thus bits having the same polygonal inner end portion but having different tapers and different depths of grooves and different thicknesses of the driving wings between the groove—to fit screws or bolts having different recesses in the heads—can be immediately exchanged, and as the bit 15 weighs only a small fraction of the older conventional unitary bit construction heretofore used, the workman can carry in his pocket or kit a very large supply of the bit members of this invention of varying sizes and dimensions for use with a single holder 20. Furthermore, since each of these bit members is much smaller and lighter than the conventional unitary bit device of the type shown in Fig. 1, its initial cost in both labor and materials is substantially reduced with respect to the corresponding costs of the type of bit device shown in Fig. 1 as described, and any one of a great number of such bits may be used as desired.

For most satisfactory use of bits of the above character, it is required that the bit end which fits into the recess of a bolt or screw be in substantially complete alignment with the shank. Otherwise the bit end will not fit properly into the recess, which is tapered and shaped of the proper dimensions to receive the bit with a snug driving fit, and this is seriously objectionable. For example, if the unitary device illustrated in Fig. 1 is somewhat out of alignment, it may still have enough driving contact with the recessed screw head to permit driving the screw home. Nevertheless, this will put all of the driving torque on only a part of the cooperating bit and surfaces, thus increasing the pressure per unit area and frequently breaking this end of the bit. In addition, such misalignment will cause a rocking motion of the working end of the bit in the recess during rotation, and this also causes excessive wear. Since the entire bit structure is a single and rigid unitary piece, the workman has to exercise considerable skill and care in getting the parts properly aligned if satisfactory work is to be assured or else run the risk of unsatisfactory work and also of breaking or excessive wear.

In the construction of the present invention, and referring particularly to the preferred embodiment shown in Figs. 2 and 3, a certain amount of adjustability or flexibility may be allowed in the parts of the bit device without in any way affecting the transmission of power, and this slight flexibility makes it unnecessary to exercise such great care and skill in the use of the bit, although the bit is properly and tightly fitted into the recessed screw or bolt head. This condition is illustrated in Fig. 6 in which the bit receiving socket in the drive portion is formed somewhat larger in cross section than the corresponding dimensions of the bit it is to receive, thus providing a small but suitable amount of clearance. This clearance, together with the slight axial clearance between the inner end of the bit and the inner end of the socket as described and shown in Fig. 6, with the bit held in place as described, permits the bit to "float" in the socket so that the parts may be out of axial alignment and still give proper driving of the bit and proper fit of the bit point in the screw or bolt.

The relative angular adjustability is considerably exaggerated in Fig. 6 for purposes of clearer disclosure, and actually only a small amount of clearance and small amount of adjustability or "floating" is required so that the bit may be caused to operate satisfactorily in alignment with the screw during operation even though the bit holder and driving mechanism may be so positioned that their axes are angularly arranged with respect to the axis of the bit 15 in the manner shown. For example, with a square-shank bit of the character shown in Figs. 2, 3 and 6, where the shank of the bit is 5/16 inches, or 0.3125 inch, square, the bit socket may satisfactorily be machined sufficiently larger to give a clearance or "float" of approximately 0.008 to 0.010 inch. Of course the amount of clearance and "float" for a particular size of bit will vary somewhat with the cross sectional dimensions of the bit itself. For example, for a ¼ inch square bit, the socket in the bit holder has been found to give satisfactory results, comparable to those referred to above, when the width of each wall of the socket is from 0.255 to 0.257 inch, giving a clearance of 0.005 to 0.007 inch.

Referring now to Figs. 4 and 5, the bit member 40 is formed similarly to bit member 15 and has its working end grooved and tapered to fit the recesses in a screw or bolt head in the manner described. The other end 41 of bit 40 is hexagonal in cross section, as distinguished from the square corresponding portion of bit 15, for proper driving fit in the correspondingly shaped socket in the bit holder 45. This bit holder 45 is made integral with its drive end 46, which is of reduced diameter and is adapted to be used with a different type of drive member, with the round shaft portion 46 held in a corresponding socket in the drive mechanism. This portion 46 is shown as provided with a groove 47 for the purpose of receiving a lock ball or the like to hold it in driving connection, and the portion 48 of bit holder 45 may be made square, as shown, or otherwise adapted for holding it to turn with the driving tool, as by means of one or more flattened portions, a groove to receive a key, or the like.

In Figs. 4 and 5, the bit holder 45 has a groove inside its outer end as indicated at 51, and it contains a normally contracted spring lock ring 49 similar to the ring 27 and which in turn snaps into slots or cut-out portions 50 in the bit 40 when the latter is pushed into position in the manner described above in connection with bit 15. For preferred operation, the hexagonal portion 41 of bit 40 is formed slightly smaller than the corresponding dimensions of the socket in bit holder 45 to provide for axial misalignment in use as described in connection with Figs. 2, 3 and 6.

In Fig. 7, the bit holder 20' of the composite bit device is shown as having a square socket 21' adapted for detachable engagement with the shaft 60 of a hand screw driver having a handle 61. The bit holder 20' also is machined to have approximately the same clearance with respect to this end of shaft 60 as is described above in connection with bit 15 and bit holder 20, and the same is true with respect to the clearance as between the bit member 15' and its receiving socket 23' in bit holder 20'. By this construction the removable bit 15' can float in the socket 23' and the handle 60 can float also with respect to the socket 21', which gives considerable additional leeway in operation and is especially desirable in connection with hand operated screw drivers of the character shown or other hand operated screw drivers such as those of the so-called "Yankee" screw driver type in which the operator's hand may cause substantial variations in alignment during operation. By the use of this double float equally satisfactory operations can be secured, as referred to for illustrative purposes above in connection with an actual instance in commercial operation.

It will be noted that in the form of construction illustrated in Fig. 7, the bit holder 20' is not provided with an intermediate shoulder or abutment such as 35 in Figs. 2, 4 and 6. This is omitted in order that the removable bit member 15' may be readily ejected for replacement by tapping the handle of the screw driver on the floor or other fixed object so that the handle 60 will move forward and act as an ejecting implement; whereas in the form of construction illustrated in Figs. 2 through 6 the removable bit must be pulled out by hand, or by pliers, or other suitable gripping tool. In Fig. 7, the numeral 70 illustrates a recess or passage in the wall of the socket portion 21' adapted to receive a spring pressed ball or other detent 71 carried by the handle. In hand operated devices the axial pressure exerted is not so great as in power driven devices and consequently the detent will ordinarily be sufficient to hold the composite bit device on the shaft 60, and the lock or snap ring 27' will be sufficient to hold the removable bit member against operating pressure. This permits of somewhat simpler machining operations and also supplies the ready means for ejecting a removable bit as desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A composite bit for use with a driving member and a screw or bolt of the character described having a bit-receiving recess tapered and shaped to receive the working point of a bit having driving wings with a snug driving fit, comprising a bit holder formed at one end for driving engagement with said driving member, the opposite end of said bit holder including a hollow portion forming a socket of polygonal cross section, a circumferential groove in said socket adjacent the outer end thereof, a bit complementary in cross section to said socket for driving engagement therein, said bit having a working point at one end thereof formed for said snug fit within said bit-receiving recess in said screw or bolt, a circumferentially arranged row of notches in the periphery of said bit at a position intermediate the ends thereof, a resilient wire retaining ring within said groove in said socket, said ring being dimensioned to snap into said notches upon insertion of said bit in said socket and being of greater diameter in cross section than the axial length of each of said notches, said groove being dimensioned to permit expansion of said ring therein to receive said bit therethrough, the dimensions of said socket being greater by a predetermined limited extent than the corresponding dimensions of the portion of said bit received therein with said ring engaged in said notches and groove, said groove being spaced from the inner end of said socket with relation to the spacing of said notches from the inner end of said bit for cooperation with said ring to support said bit in normally spaced relation with the inner end of said socket providing for floating of said bit within said socket and relative axial misalignment of said bit and said socket while maintaining proper driving of said bit and proper fit of said working point of said bit in said recess of said screw or bolt.

2. A bit for use in combination with a bit holder for driving a screw or bolt of the character described having a bit-receiving recess tapered and shaped to receive the working point of a bit having driving wings with a snug driving fit and said bit holder having a socket of polygonal cross section provided with a snap ring mounted in a retaining groove adjacent the outer end thereof, said bit being complementary in cross section to said socket for driving engagement therein, said bit having a working point at one end thereof formed for said snug fit in said bit-receiving recess in said screw or bolt, a circumferentially arranged row of notches in the periphery of said bit at a position intermediate the ends thereof for engagement with said snap ring upon insertion of said bit in said socket, said notches being dimensioned with relation to the inner diameter and cross sectional diameter of said ring to receive said ring with a snap fit therein, the dimensions of the portion of said bit received in said socket with said ring engaged in said groove and said notches being less by a predetermined limited extent than the dimensions of said socket, and said notches being spaced from the inner end of said bit with relation to the spacing of said groove from the inner end of said socket for cooperation with said ring and said groove to support said bit in normally spaced relation with the inner end of said socket providing for floating of said bit within said socket and relative axial misalignment of said bit and said socket while maintaining proper driving of said bit and proper fit of said working point of said bit in said recess of said screw or bolt.

3. A bit holder for use with a driving member and a bit of polygonal cross section provided with a working point including driving wings for driving engagement with a screw or bolt of the character described having a bit-receiving recess tapered and shaped to receive said working point with a snug drving fit, said bit being provided also with a row of notches in the periphery thereof intermediate the ends thereof, said bit holder being formed at one end for driving engagement with said driving member, the opposite end of said bit holder forming a hollow socket complementary in cross section to said bit for receiving said bit in driving engagement, a circumferential groove in said socket adjacent the outer end thereof, a resilient wire retaining ring within said groove, the inner diameter and cross sectional diameter of said ring being dimensioned with relation to said notches to effect a snap fit of said ring in said notches, said groove being dimensioned to permit expansion of said ring therein to receive said bit therethrough, the dimensions of said socket being greater by a predetermined limited extent than the corresponding dimensions of the portion of said bit received therein with said ring engaged in said notches and groove, said groove being spaced from the inner end of said socket with relation to the spacing of said notches from the inner end of said bit for cooperation with said ring to support said bit in normally spaced relation with the inner end of said socket providing for floating of said bit within said socket and relative axial misalignment of said bit and said socket while maintaining proper driving of said bit and proper fit of said working point of said bit in said recess of said screw or bolt.

HARRY G. FISCHER.
LE ROY J. WENDLING.

REFERENCES CITED

The following references are of record in the file of this patent:

UNITED STATES PATENTS

| Number | Name | Date |
| --- | --- | --- |
| 797,820 | Peck | Aug. 22, 1905 |
| 2,004,639 | Thewes | June 11, 1935 |
| 2,010,616 | Walsh | Aug. 6, 1935 |
| 2,218,631 | West et al. | Oct. 22, 1940 |
| 2,317,319 | West | Apr. 20, 1943 |
| 2,318,273 | Werme | May 4, 1943 |